H. W. BROWN.
ELECTRICAL PROTECTIVE DEVICE.
APPLICATION FILED JAN. 7, 1914.
1,214,129.
Patented Jan. 30, 1917.
2 SHEETS—SHEET 1.
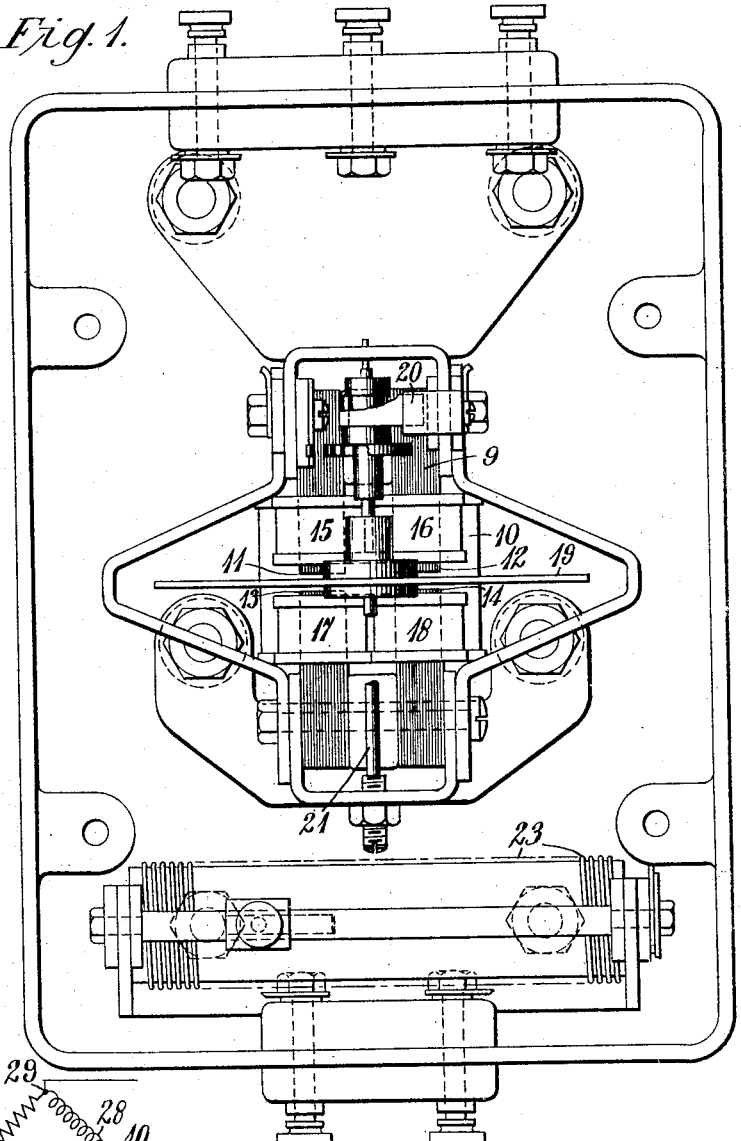
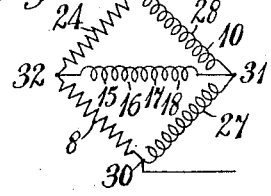
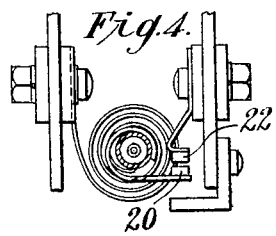
WITNESSES:
Fred H. Miller
J. H. Procter
INVENTOR
Harold W. Brown
BY
Wiley G. Carr
ATTORNEY

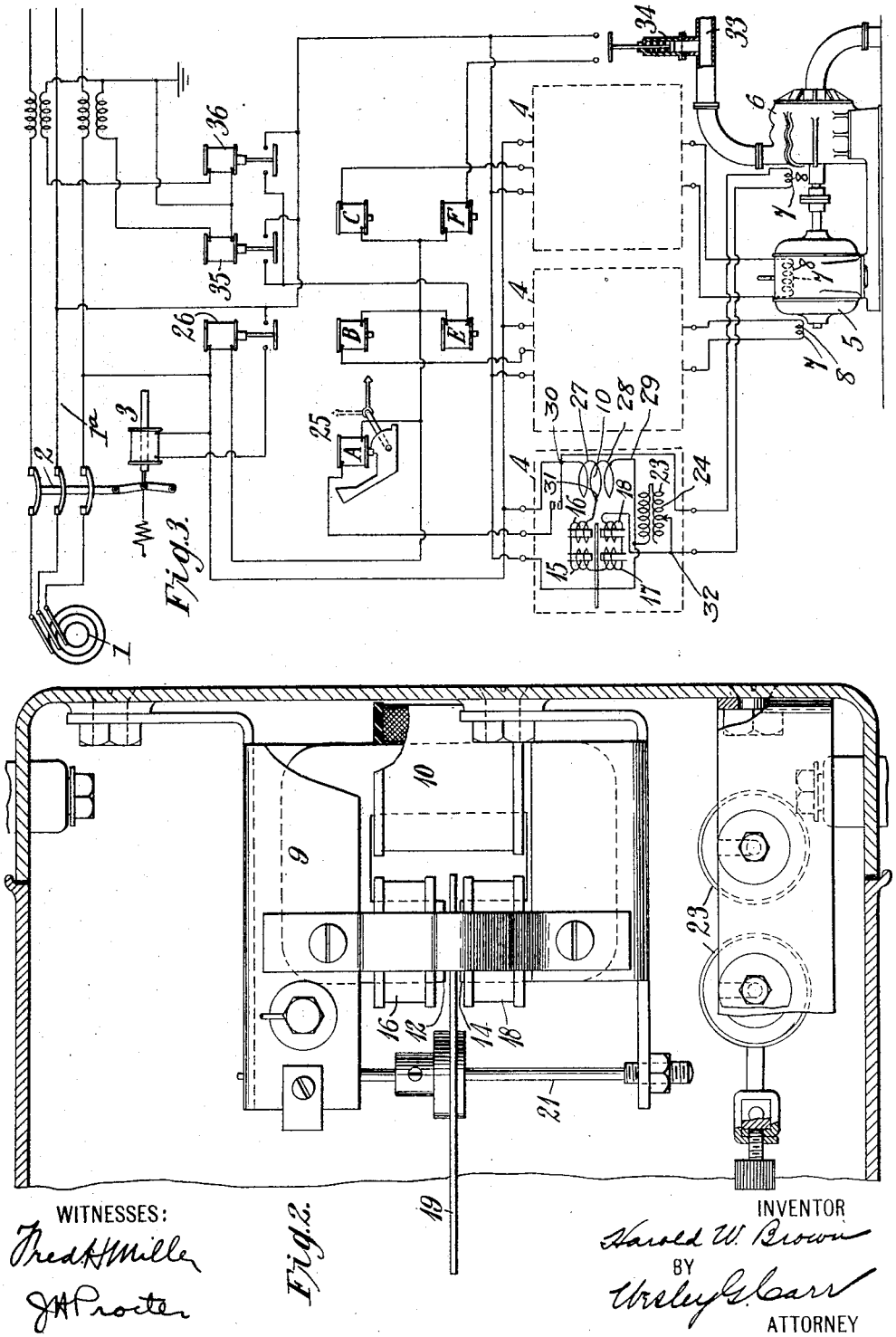

UNITED STATES PATENT OFFICE.

HAROLD W. BROWN, OF ITHACA, NEW YORK, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,214,129. Specification of Letters Patent. Patented Jan. 30, 1917.

Application filed January 7, 1914. Serial No. 810,798.

*To all whom it may concern:*

Be it known that I, HAROLD W. BROWN, a citizen of the United States, and a resident of Ithaca, in the county of Tompkins and State of New York, have invented a new and useful Improvement in Electrical Protective Devices, of which the following is a specification.

My invention relates to electrical protective devices and particularly to temperature relays.

The object of my invention is to provide a relay which will positively indicate a predetermined temperature and will actuate a means for disconnecting the circuit which causes the rise in temperature.

Numerous devices have been proposed for indicating temperatures by electrical means but, in my device, I provide auxiliary means for disconnecting a circuit when the temperature reaches a certain predetermined degree. In the majority of electrical thermometers and pyrometers the temperature is indicated by a voltmeter, it being equivalent to the voltage induced in the thermocouple of a pyrometer or the change in resistance in a Wheatstone bridge.

In my present invention, I provide a so-called induction type of relay, and I employ the principle of balanced circuits or a Wheatstone bridge to actuate the same, the winding of the instrument forming the arms of the bridge. The relay may be adjusted to operate at any predetermined temperature, and is positive in its action. Since there are no thermo-couples incorporated in my invention, a long life is assured without repairs.

Another advantage of my invention is that it is sensitive in its operation on an alternating current circuit.

In the accompanying drawings, Figure 1 is a front view of a temperature relay embodying my invention, shown partially in section and partially in elevation. Fig. 2 is a side view of the relay shown in Fig. 1, shown partially in section and partially in elevation. Fig. 3 is a diagrammatic view of a temperature relay, as applied to a pumping set. Fig. 4 is a detail view of the contact device used in my invention, and Fig. 5 is a Wheatstone bridge indicating the basic principle of my invention.

A generator 1 is connected to a circuit 1ª for the purpose of supplying a motor 5 with current to operate a pump 6. In order to disconnect the motor 5 from the circuit 1ª when the temperature of the windings or bearings of the pumping set becomes too great, the circuit interrupter 2 is disposed between the generator 1 and the circuit 1ª. The circuit interrupter 2 is actuated by an operating electromagnet 3 which is controlled by a temperature relay 4 embodying my invention. A plurality of windings 7 are disposed on the pumping set at such places as critical temperatures are liable to obtain and these windings constitute one arm 8 of a Wheatstone bridge, the other arms of which are formed by the windings of the relay 4. The relay 4 comprises a magnetizable core member 9 having polar projections 11, 12, 13 and 14 thereon. A main field magnet winding 10 is disposed around the core member 9, and windings 15, 16, 17 and 18 are disposed on the polar projections 11, 12, 13 and 14, respectively. The windings 15, 16, 17 and 18 are connected in series relation to each other and in opposition so that the resultant induced electromotive force therein will be substantially zero. That is, the voltage induced in the windings 15 and 17 are opposed to each other, and approximately equal to, those induced in the windings 16 and 18. Between the polar projections is disposed a disk armature 19 which is mounted on a shaft 21 with a movable contact member 20. The movable contact member is adapted to engage a stationary contact member 22 when the armature is actuated. An auxiliary adjustable resistor 23 is provided for the relay 4 and it constitutes one arm 24 of the Wheatstone bridge shown in Fig. 5 of the drawings. An annunciator 25 is provided for indicating the particular part of the pump set that in overheated, and a relay 26 is provided for controlling the circuit of the electromagnet 3 for the purpose of tripping the circuit interrupter 2.

The operation of my invention relies upon the producing of an unbalanced condition in a Wheatstone bridge and that this unbalancing causes a shifting field to be set up in the relay 4. The main winding 10 of the relay 4 has a tap at the middle point thereof, thus forming two arms 27 and 28 of the Wheatstone bridge. Alternating current is supplied from the circuit to be controlled to the points 29 and 30. This current energizes the magnetic structure 9 and induces voltage in the coils 15, 16, 17 and 18, but, since coils 15 and 16 are wound in opposite directions, their voltages neutralize each other, as do also the voltages of coils 17 and 18. The auxiliary resistor 23 is adjusted until there is the same potential at the points 31 and 32. Across these points are connected the coils 15, 16, 17 and 18. The main winding constitutes two arms of a Wheatstone bridge, the action of which is familiar to those versed in the art. To facilitate the understanding of my invention, however, it might be stated that when the winding 7 becomes heated, its resistance changes and the balanced condition is upset and current will flow through the coils 15, 16, 17 and 18, thus setting up a shifting magnetism in conjunction with the main magnetic flux due to the main winding 10. This causes the disk 19 to rotate, closing the contact members 20 and 22, and energizing the coil of an annunciator 25 to designate which winding or which bearing has become hot, and, at the same time, energizes a relay 26 which closes the circuit through a tripping coil 3 to operate the breaker 2, thereby opening the circuit 1ᵃ.

As shown in Fig. 3, three of the annunciator signals A B C are for use in conjunction with the three temperature relays. Annunciator signal F is for announcing the opening of the circuit when the pressure in pipe 33 rises so high that valve 34 rises and completes the circuit. Annunciator signal E is for announcing the opening of the circuit upon an overload when either relay 35 or relay 36 operates. There are numerous other arrangements wherein my invention may be used in conjunction with other safety devices which do not form a part of my invention. My invention may also be used as a temperature-indicating device by so calibrating it and adding a scale and a pointer. In order to do this, the instrument must be so adjusted that it will be balanced at any desirable temperature so that any increase in temperature above said initial temperature may be observed by an immediate operation of the pointer against the action of a spring which is used in calibrating the instrument.

I have described the principle and operation of my invention together with the component parts of the same which I now think represent the best and most advanced embodiment thereof. I do not limit my invention however to relays but it can be applied equally well as an indicating temperature meter, as covered by the appended claims.

I claim as my invention:

1. A relay comprising a magnetizable core member, a two part main winding therefor, a plurality of auxiliary windings thereon, an armature, a resistor and a resistance thermometer, said main winding constituting two arms of a Wheatstone bridge, the resistor a third, the resistance thermometer a fourth, the auxiliary windings being so connected between points of normally equal potential that, if the resistance of the resistance thermometer changes, the armature will be actuated.

2. A relay comprising a magnetizable core member having a two-part main winding and a plurality of auxiliary windings thereon, two resistors and an armature, said resistors and the main winding constituting the arms of a Wheatstone bridge, the said auxiliary windings being connected to points of equal potential on the bridge.

3. A temperature-responsive relay comprising a motor having coöperating main and auxiliary windings, and two resistors, the main winding of the motor and the two resistors constituting the arms of a Wheatstone bridge, the auxiliary winding being connected to points of equal potential thereon.

4. A relay comprising a magnetizable core member having a main and auxiliary winding thereon, a rotatable armature, a contact-making device actuated by the armature and two resistors, the said main winding and the two resistors being so connected as to constitute the four arms of a Wheatstone bridge, the auxiliary winding being so connected to the bridge that current only traverses the same under predetermined conditions to thereby actuate the armature.

5. The combination with an electro-responsive device having main and auxiliary windings, a rotatable armature and a contact-making device operatively connected to the armature, of two resistors, and a source of alternating current, the main winding and the two resistors constituting the arms of a Wheatstone bridge and the auxiliary windings being so connected to the bridge as to receive current only when the resistance of one of the resistors changes.

6. A relay comprising a magnetizable core member having main and auxiliary windings thereon, a rotatable armature, and two resistors, the said main winding and the said resistors being so connected as to constitute the arms of a Wheatstone bridge, the auxiliary winding being so connected to the bridge that current traverses the same only when the bridge becomes unbalanced to thereby actuate the armature.

7. A relay comprising a motor having two coöperating windings and an armature, and two resistors so connected to one of the motor windings as to constitute a Wheatstone bridge, the other winding of the motor being so connected to the bridge as to be supplied with current only when the bridge is unbalanced.

8. A relay comprising a magnetizable core member having polar projections thereon, a two part main winding, auxiliary windings on the polar projections so wound as not to have an electromotive force induced therein when current traverses the main winding, an armature, a contact-making device operatively connected to the armature, a variable resistor and a resistor the resistance of which varies in accordance with changes in temperature, the said main winding and the said resistor being connected to constitute the four arms of a Wheatstone bridge and the auxiliary winding being so connected to equal-potential points on the bridge that, when the resistance of one of the resistors changes due to a change in temperature, the armature is actuated.

9. A relay comprising a magnetizable core member having two coöperating windings thereon, an armature, and resistors, said resistors and one of the windings being so connected as to constitute the arms of a Wheatstone bridge, the other winding being connected to points of equal potential on the bridge.

10. A relay comprising an armature, windings for actuating the armature, resistors, and means for so connecting a part of the windings and the resistors as to constitute a closed circuit having equal potential points under predetermined conditions, the other part of the windings being adapted to be connected across the points of equal potential.

In testimony whereof, I have hereunto subscribed my name this 29th day of December 1913.

HAROLD W. BROWN.

Witnesses:
BERT T. BAKER,
JAS. R. ROBINSON, Jr.

Copies of this patent may be obtained for five cents each, by addressing the "Commissioner of Patents. Washington, D. C."